(12) United States Patent
Inoue et al.

(10) Patent No.: US 6,332,350 B1
(45) Date of Patent: Dec. 25, 2001

(54) LEAK TESTER

(75) Inventors: Akifumi Inoue; Takeshi Katoh; Kazushige Kubota; Hidemi Takahashi, all of Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 09/386,086

(22) Filed: Aug. 30, 1999

(30) Foreign Application Priority Data

Sep. 2, 1998 (JP) .................................................. 10-248760

(51) Int. Cl.$^7$ ............................... G01M 3/04; G01M 3/26
(52) U.S. Cl. ................................... 73/40; 73/49.8; 73/40.7
(58) Field of Search ................................. 73/40, 40.7, 49, 73/49.2, 49.3, 49.7, 49.8

(56) References Cited

U.S. PATENT DOCUMENTS

| | | | |
|---|---|---|---|
| 3,266,296 | * | 8/1966 | Hall ........................................... 73/40 |
| 5,431,041 | * | 7/1995 | Sala .......................................... 73/40 |
| 5,819,387 | | 10/1998 | Inoue et al. . |
| 5,850,036 | * | 12/1998 | Giromini et al. ......................... 73/40 |

FOREIGN PATENT DOCUMENTS

| 3421258 | * | 8/1985 | (DE) ........................................ 73/40 |
|---|---|---|---|
| 2274517 | * | 7/1994 | (GB) ........................................ 73/40 |

* cited by examiner

*Primary Examiner*—Daniel S. Larkin
(74) *Attorney, Agent, or Firm*—Ostrolenk, Faber, Gerb & Soffen, LLP

(57) ABSTRACT

A leak tester is used to perform a leak test on a work such as a wheel by detecting trace gas being leaked from the work. Herein, the work is installed in a chamber and is tightly held between seals. A leak tester seal is constructed using a work seal base, on which a number of channels are formed like circular rings, which are sequentially arranged with equal intervals. For example, an interval of distance between centers of adjoining channels is set at 1.27 cm to cope with different kinds of tire wheels, diameters of which are determined in accordance with the prescribed standard. Incidentally, each channel has a rectangular shape in section. In addition, a number of sealing members, made of elastic material, are formed like circular rings, which are fitted into the channels respectively. At installation of the work into the chamber of the leak tester, a rim of the wheel is pressed against the sealing member buried in the channel of the work seal base. Because the sealing member is securely supported by the channel, the sealing member is hard to be deformed, so that abrasion can be reduced. Incidentally, the leak tester uses a rubber plug, having a special design, with which a valve hole of the wheel is closed. Furthermore, the leak tester uses an instrument exclusively used for insertion and extraction of the rubber plug.

10 Claims, 6 Drawing Sheets

COMPRESSIVE FORCE

LEAK TESTER

BACKGROUND OF THE INVENTION

1. Field of the Invention

This invention relates to leak testers used for defect tests of iron wheels and aluminum wheels of automobiles, for example. Particularly, this invention relates to leak testers which are capable of performing leak tests on multiple kinds of works, having different diameters, with a long life.

This application is based on Patent Application No. Hei 10-248760 filed in Japan, the content of which is incorporated herein by reference.

2. Description of the Related Art

Conventionally, engineers use leak testers for inspecting casting defects of iron wheels and aluminum wheels (hereinafter, simply referred to as "wheels") of automobiles, for example. FIG. 4 is a schematic illustration showing an example of a leak tester conventionally known. The leak tester of FIG. 4 is basically constructed by a base 24, a bell jar 25, and a chamber 21. Herein, the bell jar 25 is capable of moving up and down on the base 24 by way of chamber seals 32, such as O-rings. A pipe 31a is arranged beneath the base 24 to introduce trace gas into the chamber 21. Herein, the pipe 31a penetrates through an introduction opening 22 of the base 24 to communicate with the chamber 21. A pipe 31b is arranged on an upper surface of the bell jar 25 to lead "leaked" trace gas, leaked in an inside of the chamber 21, to a detector. The pipe 31b penetrates through a detection opening 23 of the bell jar 25 to communicate with the chamber 21. A support rod 26 is inserted into a center hole of an upper portion of the bell jar 25 by way of a seal 33, such as an O-ring. An end portion of the support rod 26 is interconnected to a work press plate 27 in the chamber 21. Upper seals 28 having ring-like shapes are fixed to a lower surface of the work press plate 27. In addition, lower seals 29 having ring-like shapes are fixed to an upper surface of the base 24. As the seals 28 and 29, it is possible to use plate rubber materials, which are cut in ring-like shapes.

A work (30) is supplied to the aforementioned leak tester, as follows:

First, a human operator (or worker) inserts a plug into a valve hole of a wheel, which serves as a work, by fingers. Then, the human operator moves the bell jar 25 upward to open the chamber 21 and pull up the work press plate 27. The work 30 is arranged between the upper seals 28 and the lower seals 29. Such arrangement of the work 30 is performed manually or automatically by using a robot, for example. Thereafter, the work press plate 27 is forced to descend down, so that rims 34 of the work 30 are tightly sandwiched between the upper seals 28 and the lower seals 29. At the same time, the bell jar 25 is forced to descend down, so that the chamber 21 is closed. FIG. 5 is a schematic illustration showing a contact state established between the lower seal 29 and the rim 34 of the work 30. Due to compressive force being supplied from the work press plate 27, the rim 34 is pressed against the lower seal 29. Thus, the lower seal 29 partially becomes depressed at a contact area, surrounding areas of which are forced to rise.

After completion in arrangement of the work 30 in the leak tester, the leak tester evacuates air, which exists inside of the work 30, from the introduction opening 22 by way of the pipe 31a. Then, the leak tester introduces trace gas such as helium gas into the work 30 from the introduction opening 22 by way of the pipe 31a. At the same time, the detector detects gas, which exists inside of the chamber 21 and which is lead thereto from the detection opening 23 by way of the pipe 31b. If the work 30 has a defect, the trace gas leaks from the inside of the work 30, so that the chamber 21 will be filled with the trace gas. The detector detects the leaked trace gas. Thus, it is possible to detect existence of the defect and a size of the defect.

After completion of the test, the leak tester evacuates the trace gas from the work 30, while air is flown into to chamber 21. Then, the human operator takes the inserted plug by fingers and pulls it out from the valve hole. Thereafter, the human operator installs the next work having a valve hole into which a plug is inserted in the chamber 21. Thus, it is possible to proceed to testing of the next work.

In the conventional leak tester described above, the work 30 is sealed while being sandwiched between the upper seals 28 and the lower seals 29. So, compressive force is locally imparted to the upper seals 28 and the lower seals 29. However, the conventional leak tester does not provide a support which supports the upper seals 28 and the lower seals 29 from their peripherals. For this reason, the upper seals 28 and the lower seals 29 must be noticeably deformed. That is, as shown in FIG. 5, the upper seal 29 (and the lower seal 28) becomes partially depressed at the contact area, surrounding areas of which swell up. When the work is changed with another work having a different diameter, a position that compressive force affects changes as well, so an area of the seal being deformed is correspondingly changed. If such deformation repeatedly occurs, surfaces of the seals 28 and 29 must be abraded so as to cause formation of cracks. In that case, there is a problem that the leak test cannot be performed.

In addition, the surfaces of the lower seals 29 are formed like flat planes. So, when the work 30 is installed into the leak tester or when the work 30 is sandwiched between the seals, the work 30 is easily changed in location. That is, it is difficult to automatize supply process or removal process of the work 30.

Further, when the plug is inserted into the valve hole of the wheel, the human operator uses his or her fingers to insert or extract it. Such manual operations for insertion and extraction are not good in work efficiency. Once the air is evacuated from the work so that the inside of the work is placed in a decompressed state, the plug must be tightly attached to the work. In that case, a large force is required to extract the plug from the work. However, it is difficult to apply sufficient extraction force to the plug by fingers. In addition, reliability of the leak test is reduced due to abrasion of the plug.

SUMMARY OF THE INVENTION

It is an object of the invention to provide a leak tester which is capable of improving a reliability of a leak test by reducing abrasion of sealing members.

It is another object of the invention to provide a leak tester which is capable of easily installing a work therein.

A leak tester of this invention is basically designed to perform a leak test on a work such as a wheel by detecting trace gas being leaked from the work. Herein, the work is installed in a chamber and is tightly held between seals.

This invention employs a leak tester seal constructed using a work seal base, on which a number of channels are formed like circular rings, which are sequentially arranged with equal intervals. In addition, a number of sealing members are formed like circular rings, which are fitted into the channels, respectively. Herein, the sealing members are made of elastic material providing desired elasticity, while the work seal base is made of material whose hardness is higher than the sealing members. For this reason, even if the sealing member is depressed by the work, the work seal base is hard to deform, so that it is possible to reduce deformation of the leak tester seal as a whole. In addition, the sealing members are fitted into the channels of the work seal base, so each sealing member is not deformed greatly in response to a compressive force applied thereto from the work. Thus, it is possible to reduce friction between the sealing member and the work. As a result, it is possible to improve reliability in leak testing.

It is preferable that the upper surfaces of the channels differ from each other in heights like steps. In that case, it is possible to use an interior wall surface of the step, located outside of the step on which the rim of the work is currently placed, as a guide for installation of the work. Thus, it is possible to easily fix the location of the work being installed.

In addition, it is preferable that an interval of distance between centers of adjoining channels is set at 1.27 cm because the diameters of tire wheels change by 1 inch (=2.54 cm) in accordance with the prescribed standard. So, by setting such an interval of distance at 1.27 cm, the leak tester is capable of certainly coping with the tire wheels of various sizes.

Further, a number of cutout portions are formed along an inner periphery and an outer periphery of the sealing member and are arranged alternately in a longitudinal direction of the sealing member. By using the cutout portions, it is possible to easily extract air, which remains in a space between a bottom surface of the sealing member and a bottom wall of the channel of the work seal base. Thus, it is possible to further improve the reliability in leak testing.

Moreover, the leak tester of this invention uses a rubber plug, having a special design, with which a valve hole of the wheel is closed. Herein, the rubber plug is constructed by an insertion portion, a stopper portion, a main portion, and a flange portion, which are connected together in series. In addition, a first hole is formed to penetrate through the main portion from the flange portion and reach an end portion of the insertion portion. Further, a second hole is formed to penetrate through the main portion and cross at a right angle with the first hole within the main portion of the rubber plug.

This invention uses two kinds of instruments exclusively designed for insertion and extraction of the rubber plug. That is, an insertion instrument is used for insertion of the rubber plug into the valve hole of the wheel, wherein it is constructed by an insertion rod and a stage portion, which are inserted into the first hole of the rubber plug. In addition, an extraction instrument is used for extraction of the rubber plug from the valve hole of the wheel, wherein it is constructed using a hook, which is hooked by the second hole of the rubber plug.

As described above, the insertion and extraction of the rubber plug are performed using two instruments, so it is possible to improve an efficiency in insertion/extraction operations. In addition, it is possible to avoid occurrence of frictional damages of the rubber plug, which is brought into contact with the valve hole of the wheel. The two instruments are related to two holes of the rubber plug, which differ from each other in positions and directions. So, it is easy for a human operator (or worker) to handle the insertion/extraction operations without errors. Further, it is easy for the human operator to distinguish the insertion and extraction operations, which are instructed.

BRIEF DESCRIPTION OF THE DRAWINGS

These and other objects, aspects and embodiments of the present invention will be described in more detail with reference to the following drawing figures, of which.

DESCRIPTION OF THE PREFERRED EMBODIMENTS

This invention will be described in further detail by way of examples with reference to the accompanying drawings.

Figure 1:
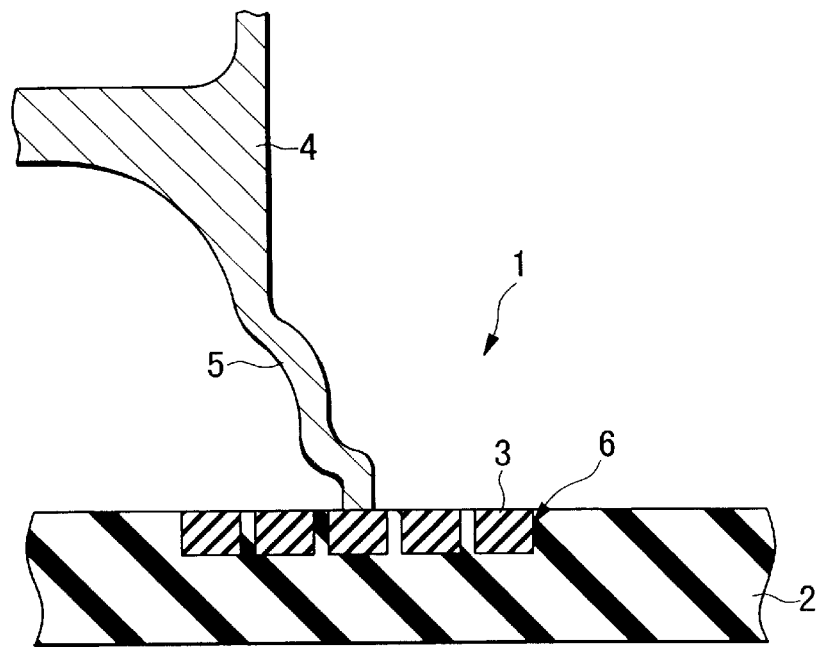
FIG. 1 is a schematic illustration showing a leak tester seal used for a leak tester in accordance with embodiment one of the invention.

FIG. 1 is a schematic illustration showing a leak tester seal 1 which is used in a leak tester in accordance with embodiment one of the invention. In the first embodiment, a number of channels 6 are formed at selected locations with equal intervals on an upper surface of a work seal base 2. Herein, each channel is formed in a circular ring shape, while it has a rectangular shape in section. Incidentally, an interval of distance between adjoining channels is set at 1.27 cm, for example. In addition, a sealing member 3, which has a ring-like shape and which is made of elastic material, is placed to engage with each of the channels 6. As described above, the leak tester seal 1 is constructed by the work seal base 2 and the sealing members 3. Herein, a leak test is performed by pressing a rim 5 of a work 4 being subjected to leak test against the sealing member 3, which is buried in the channel 6.

Standards determine that tire wheels change in diameters by one inch (=2.54 cm). In the first embodiment, an interval of distance being measured between centers of the adjoining channels 6, formed on the work seal base 2, is set at 1.27 cm. So it is possible to certainly establish a contact between the rim 5 of the work 4 and the sealing member 3. The sealing member 3 well engages with the channel 6 such that it is supported by three walls of the channel 6, i.e., the side walls and the bottom wall. Even if an amount of compressive force, which is effected in the conventional art, is applied to the sealing member 3, the sealing member 3 is supported in proximity to a location that the compressive force effects, so it is possible to reduce an amount of deformation. By inserting elastic members into channels which are formed on the base installing a tested object, it is possible to narrow a range that deformation occurs, therefore, it is possible to avoid occurrence of cracks being formed on sealing members.

As described above, it is possible to reduce chances in formation of cracks. That is, it is possible to increase the life of the leak tester seal until seal performance vanishes. Concretely speaking, we have confirmed that the leak tester seal of the first embodiment is increased in life by five to ten times longer than the life of the conventional seal.

If a certain material whose hardness is high is employed for the work seal base 2, it is possible to reduce deformation of the leak tester seal 1 as a whole.

Figure 2:
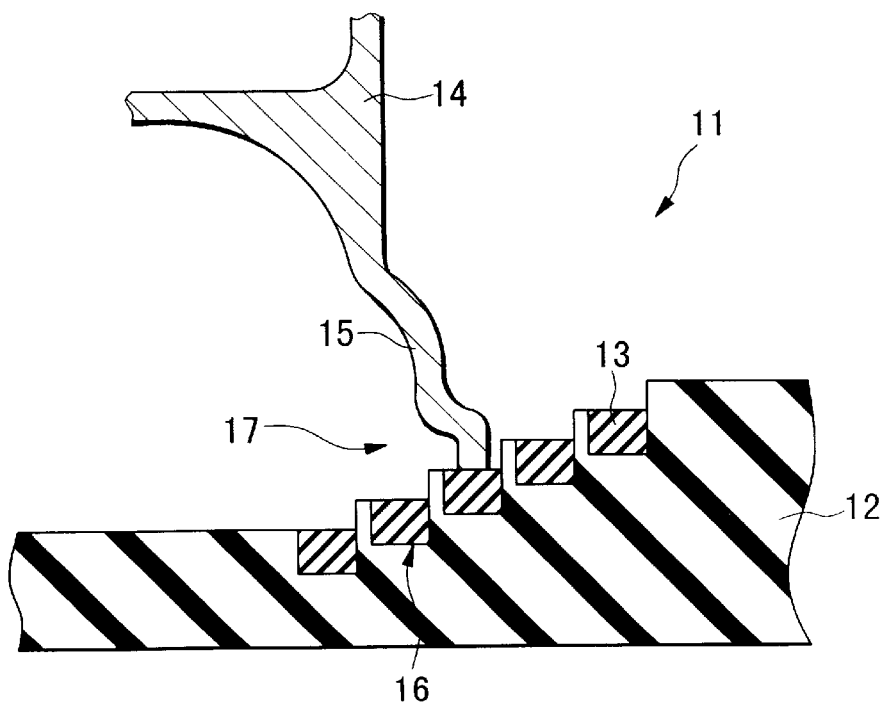
FIG. 2 is a schematic illustration in section of a leak tester seal used for a leak tester in accordance with embodiment two of the invention.

FIG. 2 is a schematic illustration in section of a leak tester seal 11, which is used for a leak tester in accordance with a second embodiment of the invention. In the second embodiment, steps 17 are formed in circular ring shapes on an upper surface of a work seal base 12. Herein heights of the steps 17 are sequentially increased in a direction toward an outer periphery of the work seal base 12. Each step 17 has a width of 1.27 cm, for example. Channels 16 are formed with respect to the steps 17, respectively. That is, the channels 16 having a certain width and a rectangular shape in section is formed at an outer periphery portion of the steps 17. In addition, a sealing member 13 having a ring-like shape is inserted and fitted into the channel 16. As described above, the leak tester seal 11 of the second embodiment is constructed by the work seal base 12 and the sealing members 13.

The second embodiment is characterized in that the installation surfaces differ from each other in heights with respect to multiple kinds of works 14 whose diameters differ from each other. For this reason, when the work 14 is installed into the leak tester or it is sandwiched in vertical directions, it is possible to use an interior side wall of a step, which is placed outside of a step on which the work 14 is installed, as a guide for a rim 15 of the work 14. Thus, it is possible to avoid occurrence of a positional deviation of the work 14 being installed. So, the second embodiment is capable of improving a reliability in operations using a robot hand or else to automatically install and remove the work 14 in the leak tester, for example.

Figure 3A:
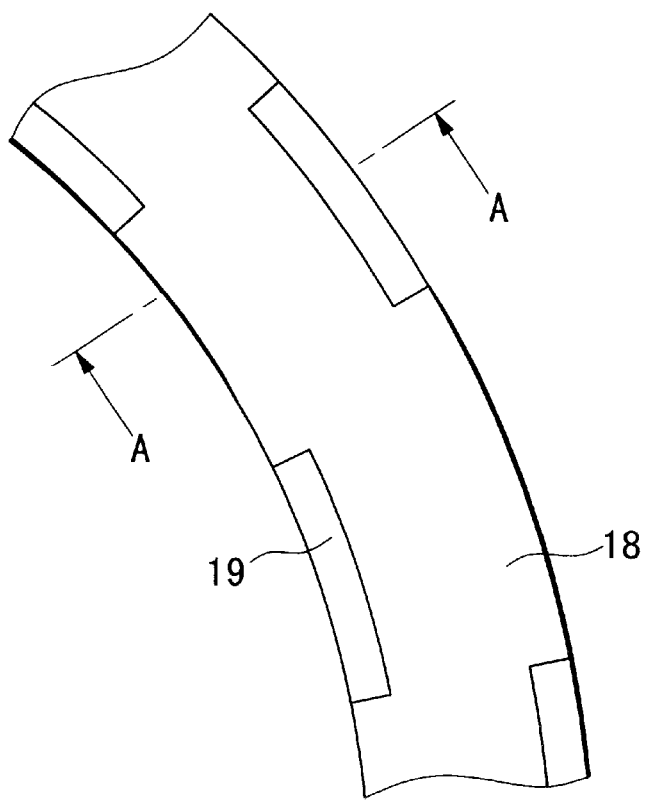
FIG. 3A is a plan view showing a sealing member used for a leak tester in accordance with embodiment three of the invention.
Figure 3B:
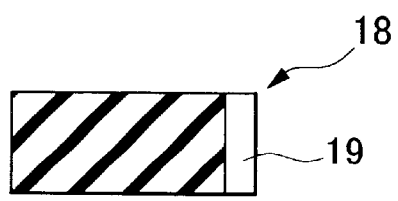
FIG. 3B is a sectional view of the sealing member taken along line A—A in FIG. 3A.
Figure 4:
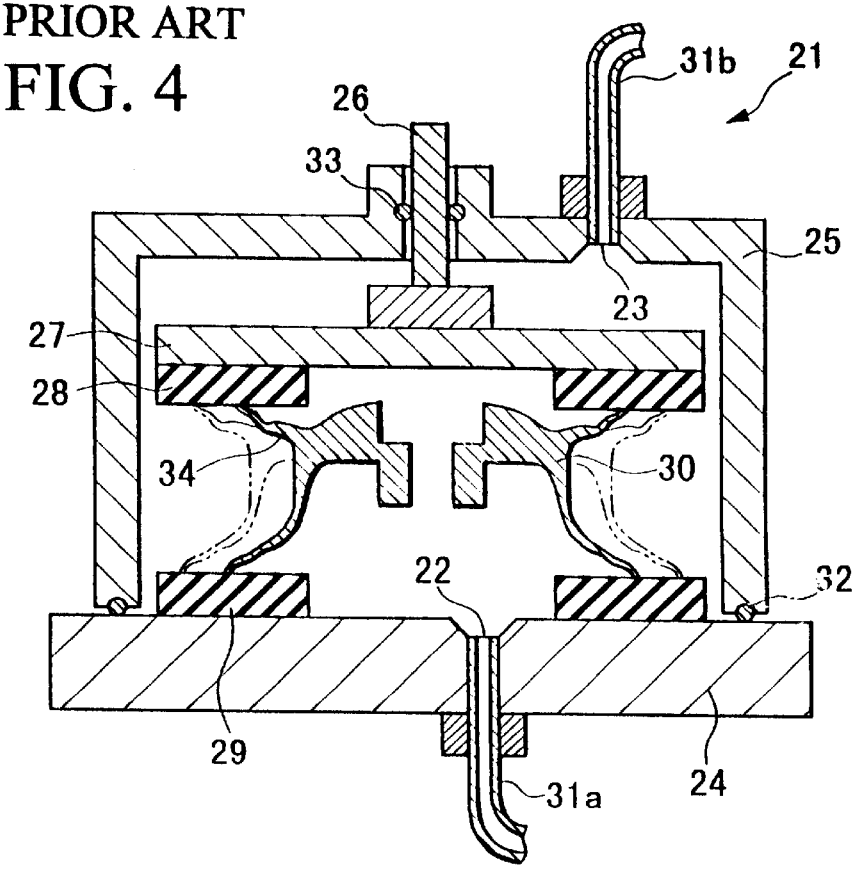
FIG. 4 is a schematic illustration showing a construction of a conventional leak tester in which a work is installed for leak testing.
Figure 5:
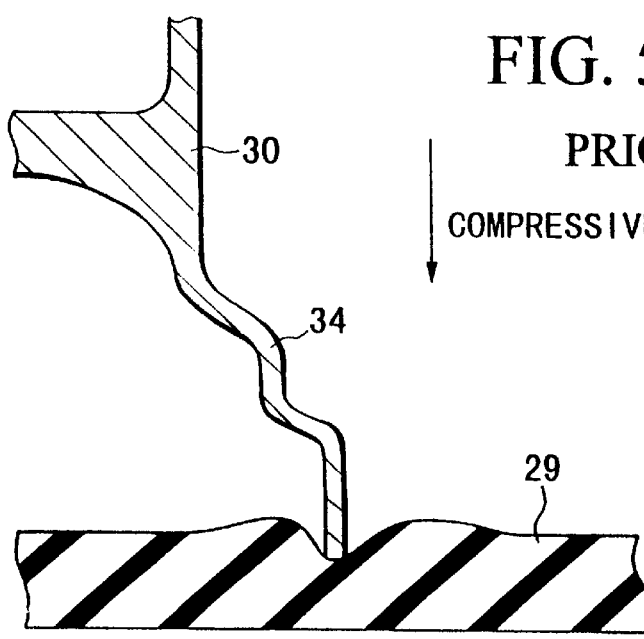
FIG. 5 is a schematic illustration showing a contact state between an lower seal and a rim of the work.

When the sealing member is inserted and fitted into the channel, there is a possibility that air remains in a space between the bottom wall of the channel and the bottom surface of the sealing member. If the air remains in the space between the bottom wall of the channel and the bottom surface of the sealing member when the inside of the chamber of the leak tester is placed in a decompressed state to the vacuum, the air irregularly leaks out into the inside of the chamber, which is detected by a detector (not shown). In that case, a measurement accuracy may be reduced. FIG. 3A is a schematic plan view showing a selected part of a sealing member 18, which is used in a leak tester in accordance with a third embodiment. FIG. 3B is a schematic sectional view of the sealing member 18 taken along line A—A in FIG. 3A. The third embodiment is characterized in that cutout portions 19 whose widths are under one mm are formed along an outer periphery and an inner periphery of the sealing member 18. Herein, the cutout portions 19 are arranged in a longitudinal direction of the sealing member 18 in such a way that the cutout portions formed along the inner periphery are arranged alternately with the cutout portions formed along the outer periphery. By employing such a cutout shape for the sealing member 18, the air which remains in the space between the bottom wall of the channel and bottom surface of the sealing member can be easily extracted during evacuation to decompress the chamber to the vacuum. If the width of the cutout portion 19 exceeds one mm, an effect to support the sealing member 18 by side walls of the channel is reduced, so the sealing member 18 is easily deformed. Therefore, it is preferable that the width of the cutout portion 19 is under one mm.

The aforementioned embodiments describe the leak tester seals which are employed as lower seals. Of course, it is possible to employ the leak tester seals of the embodiments as the upper seals, by which it is possible to obtain similar effects of the lower seals with respect to the upper seals as well.

Figure 10:
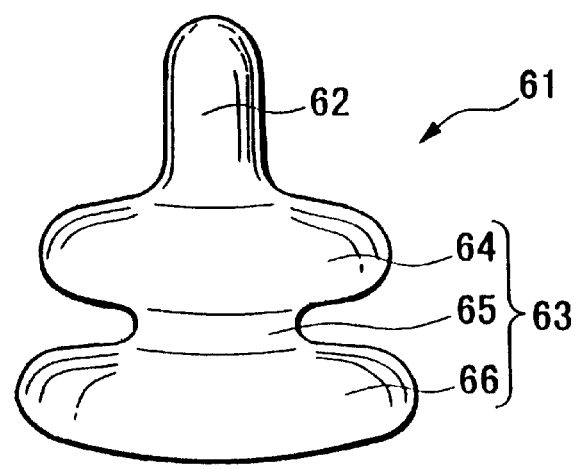
FIG. 10 is a schematic illustration showing an appearance of a rubber plug conventionally used.
Figure 11:
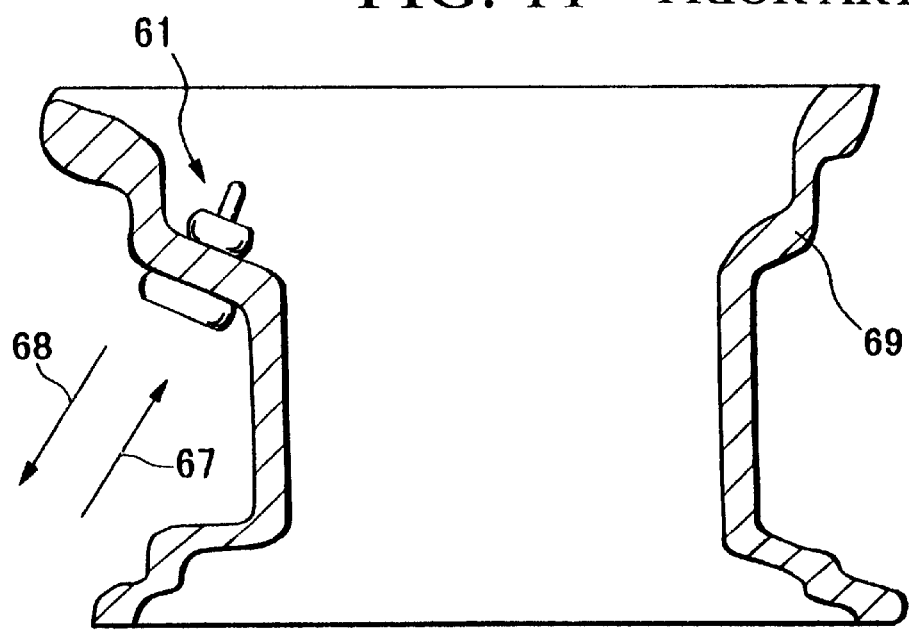
FIG. 11 is a schematic illustration in section of a tire wheel having a valve hole into which the rubber plug is inserted.

Next, a description will be given with respect to a plug with which a valve hole of an aluminum wheel is closed and methods to insert and extract the plug. FIG. 10 is a schematic illustration showing a rubber plug 61 conventionally used. FIG. 11 is a schematic illustration in section of a tire wheel into which the conventional rubber plug 61 is inserted. As shown in FIG. 10, the conventional rubber plug 61 is mainly constructed by a guide portion 62 and a main portion 63. Herein, the guide portion 62 has an outer diameter which is smaller than a bore diameter of the valve wheel, while the main portion 63 of the plug 61 is used to close the valve hole. The main portion 63 consists of an inner stopper 64, a neck portion 65, and an outer stopper 66, which are connected together in series. The inner stopper 64 is connected to the guide portion 62 to have an outer diameter which is larger than the bore diameter of the valve hole. The neck portion 65 has an outer diameter which is approximately identical to the bore diameter of the valve hole. The outer stopper 66 has an outer diameter which is larger than the bore diameter of the valve hole.

The rubber plug 61 is inserted into and extracted from the valve hole of a wheel 69 (see FIG. 11) as follows:

At insertion of the rubber plug into the valve hole, the guide portion 62 is firstly inserted into the valve hole of the wheel 69. Then, a human operator applies an insertion force to the back of the plug 61 by fingers (or hand) in a direction 67 shown in FIG. 11. Thus, the plug 61 is pressed in the direction 67 so that the inner stopper 64 is inserted into the inside of the wheel 69 by way of the valve hole while the outer stopper 66 remains outside of the wheel 69. At extraction of the plug 61 from the valve hole, the human operator applies an extraction force to the plug 61 by fingers (or hand) in a direction 68, which is opposite to the direction 67.

In order to avoid leakage of gas from the valve hole, the plug 61 is tightly attached to the valve hole. For this reason, a strong force is required for insertion and extraction of the plug 61 by fingers (or hand). Such manual operation is very difficult. In addition, the inner stopper 64 of the plug 61 whose outer diameter is larger than the bore diameter of the valve hole is inserted into and extracted from the valve hole, so it is severely damaged by abrasion. This causes a problem that the reliability of leak testing is reduced.

The inventors of this invention have made studies to solve the aforementioned problem. Results of the studies show that the abrasion of the rubber plug can be reduced by optimizing the shape of the rubber plug and by using special instruments for insertion and extraction of the rubber plug.

Figure 6A:
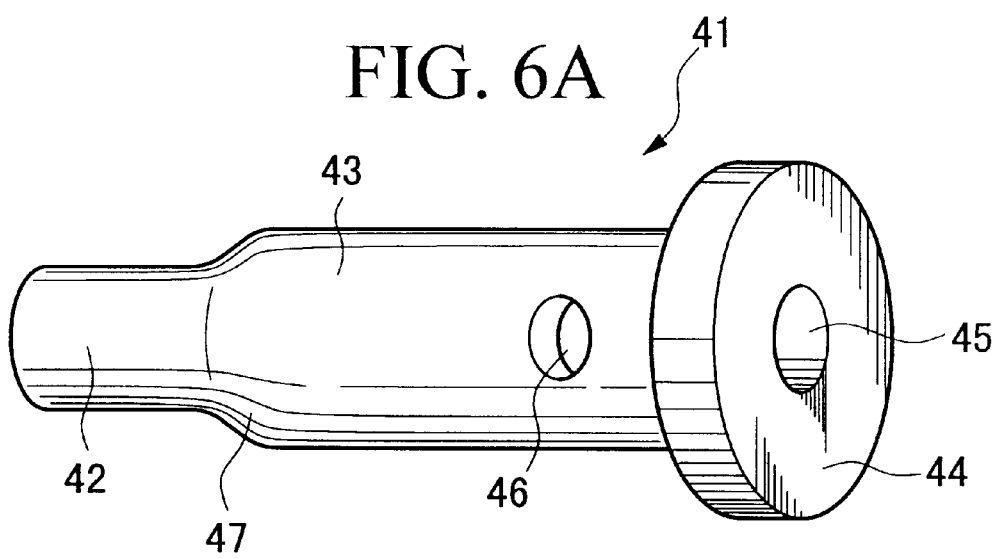
FIG. 6A is a perspective view schematically showing an appearance of a rubber plug used for the leak testers of the embodiments.
Figure 6B:
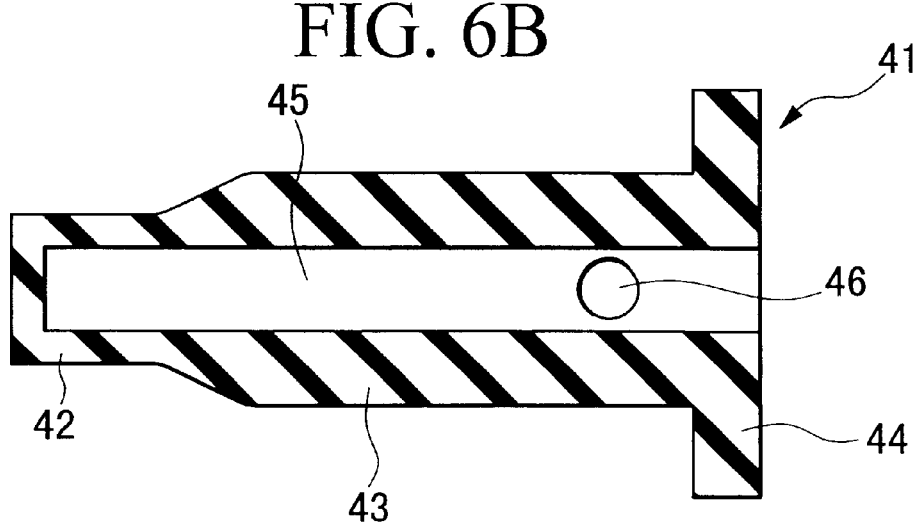
FIG. 6B is a schematic illustration in section of the rubber plug.

Next, a description will be given with respect to the rubber plug, which is used for the leak tester of the embodiments with reference to the accompanying drawings. FIG. 6A is a perspective view schematically showing a rubber plug 41, which is used for the leak testers of embodiments of the present invention. FIG. 6B is a schematic illustration in section of the rubber plug 41. The rubber plug 41 basically consists of an insertion portion 42, a main portion 43, and a flange portion 44, which are connected together in series. Herein, the insertion portion 42 is inserted and fitted into a valve hole of a wheel. The main portion 43 of the plug 41 has an outer diameter, which is greater than a bore diameter of the valve hole. The flange portion 44 is connected to the main portion 43. A hole 45 is formed to penetrate through the plug 41 from a bottom of the flange portion 44 to an end portion of the insertion portion 42. So, the rubber plug 41 as a whole is formed "hollow" due to the hole 45. In addition, a hole 46 is formed through the main portion 43 of the plug 41 at its selected position to pass the center of the main portion 43 while crossing at a right angle with the aforementioned hole 45.

Further, a stopper 47 is formed between the insertion portion 42 and the main portion 43 of the plug 41. When the insertion portion 42 is inserted into the valve hole of the wheel, the stopper 47 comes in contact with the wheel to regulate an insertion position of the rubber plug 41.

Figure 7:
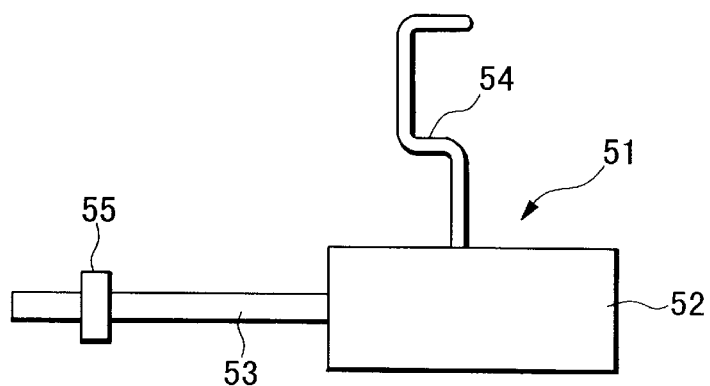
FIG. 7 is a schematic illustration showing an insertion/extraction instrument used for insertion and extraction of the rubber plug.

Next, a description will be given with respect to an insertion/extraction instrument, which is used for insertion and extraction of the rubber plug 41. FIG. 7 is a schematic illustration showing an insertion/extraction instrument 51. The insertion/extraction instrument 51 is constructed such that a main portion 52 is connected with an insertion rod 53 and an extraction hook 54. Herein, the insertion rod 53 has a straight-line shape and an outer diameter which is smaller than a bore diameter of the hole 45. In addition, a stage portion 55 having a disc-plate-like shape is attached to a selected position of the insertion rod 53. Incidentally, the stage portion 55 has an outer diameter, which is identical to or slightly greater than a bore diameter of the hole 45.

Figure 8:
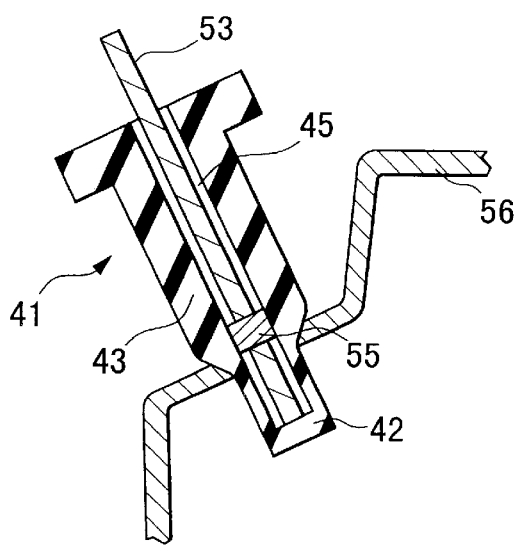
FIG. 8 is a schematic illustration in section of the rubber plug, which is inserted into a valve hole of a wheel by way of the insertion/extraction instrument.

FIG. 8 is a schematic illustration in section of the rubber plug 41, which is inserted into a valve hole of a wheel 56. When the rubber plug 41 is inserted into the valve hole of a wheel 56, the insertion rod 53 of the insertion/extraction instrument 51 is inserted into the hole 45 of the rubber plug 41. Thus, during the insertion, a tip end of the insertion rod 53 which is thinner than the hole 45 depresses an interior wall of the end portion of the insertion portion 42 of the plug 41. Therefore, tension is applied to the insertion portion 42 in its insertion direction, so that the outer diameter of the insertion portion 42 becomes small as a whole. This reduces friction between the interior walls of the valve hole and the rubber plug 41. Thus it is possible to reduce abrasion of the rubber plug 41. Then, the human operator inserts the plug 41 deeply into the valve hole so that the main portion 43 comes in contact with edges of the valve hole. In this case, the outer diameter of the main portion 43 of the rubber plug 41 is greater than the bore diameter of the valve hole, while the stage portion 55 attached to the insertion rod 53 prevents the rubber plug 41 from becoming smaller. Therefore, the rubber plug 41 cannot be inserted into the valve hole to exceed a position at which the stopper portion 47 of the rubber plug 41 comes in contact with the edges of the valve hole. Thus, the rubber plug 41 closes the valve hole at that position.

Figure 9:
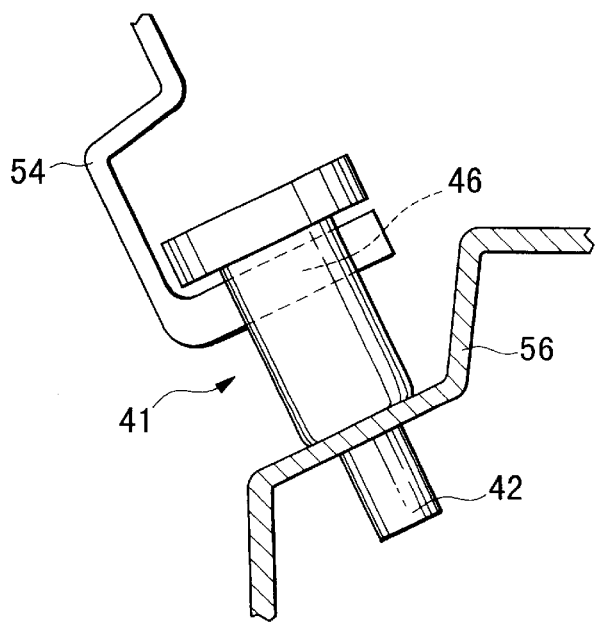
FIG. 9 is a schematic illustration showing the rubber plug, which is extracted from the valve hole of the wheel by way of the insertion/extraction instrument.

FIG. 9 is a schematic illustration showing the rubber plug 41, which is extracted from the valve hole of the wheel 56. When the rubber plug 41 is extracted from the valve hole of the wheel 56, the extraction hook 54 of the insertion/extraction instrument 51 is inserted into the hole 46 of the rubber plug 41. Using the insertion/extraction instrument 51, the human operator extracts the rubber plug 41 from the valve hole of the wheel 56. In this case, tension is applied to the rubber plug 41 in its extraction direction, so that the diameter of the insertion portion 42 becomes small. Thus, it is possible to easily extract the rubber plug 41 from the valve hole of the wheel 56 without causing friction between the rubber plug 41 and interior walls of the valve hole.

The aforementioned insertion/extraction instrument is equipped with both an insertion member and an extraction member. However, it is possible to provide an insertion instrument and an extraction instrument as independent members.

As described heretofore, embodiments of the invention have a variety of effects and technical features, which are summarized as follows:

(1) This invention is capable of improving the reliability in leak testing with respect to a variety of works, such as wheels. Particularly, the leak tester seal of this invention is designed such that a sealing member having a circular ring shape is certainly supported by a channel, having a rectangular shape in section, on the work seal base. Therefore, an amount of deformation of the sealing member is relatively small, so it is possible to reduce friction and abrasion.

(2) The channels are arranged concentrically with each other on the work seal base, wherein they are formed like steps, the heights of which are gradually increased in an outer peripheral direction. In that case, the work can be installed in the chamber of the leak tester while being guided by an interior wall surface of the step next to a step on which a rim of the work currently is located. Therefore, it is possible to easily fix an installed location of the work in the chamber of the leak tester.

(3) An interval of distance between centers of adjoining channels is set at 1.27 cm. Thus, it is possible to certainly bring the rim of the tire wheel whose size is determined in accordance with the prescribed standard into contact with the sealing member.

(4) Cutout portions are formed along an inner periphery and an outer periphery of the sealing member and are arranged alternately with each other. Using the cutout portions, it is possible to easily extract the air which remains in a space between the bottom surface of the sealing member and the bottom wall of the channel. Thus, it is possible to further improve the reliability in leak testing.

(5) Two instruments are used for insertion and extraction of the rubber plug being inserted into the valve hole of the wheel, wherein an insertion instrument is inserted into a first hole of the rubber plug to push it into the valve hole, while an extraction instrument hooks a second hole of the rubber plug, which crosses with the first hole, to pull it out from the valve hole. Thus, tension is applied to the rubber plug in its longitudinal direction so that the outer diameter of the rubber plug is reduced at insertion and extraction. Thus, it is possible to avoid friction and abrasion of the rubber plug at its insertion and extraction. So, it is possible to improve the reliability in leak testing.

(6) Directions to operate the aforementioned instruments differ from each other at the insertion and extraction respectively. So, it is easy for the human operator to distinguish the operations for insertion and extraction of the rubber plug.

(7) If the aforementioned leak tester seals are used to seal both of the outer periphery of the wheel and the valve hole at testing, it is possible to avoid occurrence of frictional damages of the sealing member and rubber plug. Thus, it is possible to improve the reliability in leak testing with respect to the wheels of the automobiles.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A leak tester which performs a leak test on a work by detecting a leak of gas between an interior and an exterior of the work whose outer periphery is enclosed, said leak tester comprising:

a work seal base on which surface a plurality of channels each having a circular ring shape are formed; and a plurality of sealing members, made of elastic material, which are fitted into the plurality of channels, respectively.

2. A leak tester according to claim 1 wherein the plurality of channels are formed on steps, which differ from each other in heights, on the work seal base.

3. A leak tester according to claim 2 wherein an interval of distance between centers of the channels which adjoin with each other is set at 1.27 cm.

4. A leak tester according to claim 3 wherein a plurality of first cutout portions are intermittently formed along an inner periphery of the sealing member, while a plurality of second cutout portions are intermittently formed along an outer periphery of the sealing member, and wherein the first and second cutout portion are arranged in a longitudinal direction of the sealing member and are arranged alternately in positions.

5. A leak tester according to claim 2 wherein a plurality of first cutout portions are intermittently formed along an inner periphery of the sealing member, while a plurality of second cutout portions are intermittently formed along an outer periphery of the-sealing member, and wherein the first and second cutout portion are arranged in a longitudinal direction of the sealing member and are arranged alternately in positions.

6. A leak tester according to claim 1 wherein an interval of distance between centers of the channels which adjoin with each other is set at 1.27 cm.

7. A leak tester according to claim 6 wherein a plurality of first cutout portions are intermittently formed along an inner periphery of the sealing member, while a plurality of second cutout portions are intermittently formed along an outer periphery of the sealing member, and wherein the first and second cutout portion are arranged in a longitudinal direction of the sealing member and are arranged alternately in positions.

8. A leak tester according to claim 1 wherein a plurality of first cutout portions are intermittently formed along an inner periphery of the sealing member, while a plurality of second cutout portions are intermittently formed along an outer periphery of the sealing member, and wherein the first and second cutout portion are arranged in a longitudinal direction of the sealing member and are arranged alternately in positions.

9. A leak tester seal used for a leak tester in which a wheel having a valve hole being closed with a plug is installed for a leak test, comprising:

a base;

a plurality of channels, which are formed on a surface of the base and which are arranged like circular rings being sequentially arranged with equal intervals, wherein each of the channels has a rectangular shape in section; and a plurality of sealing members, made of elastic material, which are formed like circular rings to be fitted into the plurality of channels, respectively, whereby at the leak test, a rim of the wheel is pressed against the sealing member buried in the channel on the base.

10. A leak tester seal according to claim 9 wherein each sealing member is formed in such a way that a plurality of cutout portions are formed along an inner periphery and an outer periphery of the sealing member and are arranged alternately in positions.

* * * * *